United States Patent
Joshi et al.

(10) Patent No.: US 6,314,290 B1
(45) Date of Patent: Nov. 6, 2001

(54) MOBILE SATELLITE SYSTEM AND METHOD FOR IMPLEMENTING A SINGLE-HOP TERMINAL-TO-TERMINAL CALL

(75) Inventors: Chandra Joshi, Gaithersburg, MD (US); Anthony Noerpel, Lovettsville, VA (US); Chi-Jiun Su, Derwood; Dave Roos, Boyds, both of MD (US)

(73) Assignee: Hughes Electronics Corporation, El Segundo, CA (US)

(*) Notice: Subject to any disclaimer, the term of this patent is extended or adjusted under 35 U.S.C. 154(b) by 0 days.

(21) Appl. No.: 09/247,847

(22) Filed: Feb. 11, 1999

Related U.S. Application Data

(63) Continuation-in-part of application No. 09/115,098, filed on Jul. 13, 1998.
(60) Provisional application No. 60/110,253, filed on Nov. 30, 1998.

(51) Int. Cl.[7] ........................................ H04Q 7/20
(52) U.S. Cl. .................... 455/427; 455/428; 455/430; 455/433; 455/445; 455/450
(58) Field of Search ................................ 320/360, 323, 320/522; 455/427, 428, 430, 432, 433, 435, 445, 456, 12.1, 13.1, 13.2, 515

(56) References Cited

U.S. PATENT DOCUMENTS

| | | | |
|---|---|---|---|
| 5,439,190 | * 8/1995 | Horstein et al. | 379/59 |
| 5,526,404 | 6/1996 | Wiedeman et al. | 379/60 |
| 5,551,624 | * 9/1996 | Horstein et al. | 342/356 |
| 5,572,674 | * 11/1996 | Ernst | 395/200.1 |
| 5,594,780 | 1/1997 | Wiedeman et al. | 379/59 |
| 5,664,006 | 9/1997 | Monte et al. | 455/405 |
| 5,689,568 | * 11/1997 | Laborde | 455/12.1 |
| 5,713,075 | 1/1998 | Threadgill et al. | 455/427 |
| 5,715,297 | 2/1998 | Wiedeman | 379/60 |
| 5,781,540 | * 7/1998 | Malcolm et al. | 370/321 |
| 5,790,939 | * 8/1998 | Malcolm et al. | 455/13.2 |
| 5,809,141 | 9/1998 | Dent et al. | |
| 5,822,311 | 10/1998 | Hassan et al. | 370/322 |
| 5,825,889 | 10/1998 | Dent et al. | |
| 5,842,125 | 11/1998 | Modzelesky et al. | 455/426 |
| 5,850,602 | 12/1998 | Tisdale et al. | 455/430 |

(List continued on next page.)

FOREIGN PATENT DOCUMENTS 0 869 628 A   7/1998  (EP) .

*Primary Examiner*—Daniel Hunter
*Assistant Examiner*—Yemane Woldetatios
(74) *Attorney, Agent, or Firm*—John T. Whelan; Michael W. Sales

(57) ABSTRACT

A mobile satellite (MSAT) system is provided for establishing a single-hop terminal-to-terminal call between two terminals. The MSAT system maintains a signaling path between each terminal and a gateway station during the terminal-to-terminal call although a call path between the mobile switching center and the originating terminal is blocked by the satellite. During single-hop call establishment, satellite channels for the terminal-to-terminal call path and for signaling are allocated. The allocated channels are assigned when a direct satellite link for the terminal-to-terminal call is established; otherwise, the call can proceed as a double-hop call using previously assigned satellite channels. A verification signal is sent on the direct satellite link which is for processing by the terminals and which contains information that causes the signal to be ignored by a gateway station. During a single-hop terminal-to-terminal call, signaling from a destination gateway station to an originating terminal at another gateway station is sent via an intranetwork communication system connecting traffic control subsystems in different gateway stations and the satellite channels allocated to the originating terminal

27 Claims, 8 Drawing Sheets

U.S. PATENT DOCUMENTS

| | | | | |
|---|---|---|---|---|
| 5,884,142 | * | 3/1999 | Wiedeman et al. | 455/12.1 |
| 5,943,324 | * | 8/1999 | Ramesh et al. | 370/321 |
| 5,956,646 | * | 9/1999 | Kolev et al. | 455/502 |
| 5,974,092 | * | 10/1999 | Roos et al. | 375/272 |
| 6,052,364 | * | 4/2000 | Chalmers et al. | 370/312 |
| 6,061,562 | * | 5/2000 | MArtin et al. | 455/431 |
| 6,081,709 | * | 6/2000 | Karabinis | 455/427 |
| 6,108,318 | * | 8/2000 | Kolev et al. | 370/323 |
| 6,154,452 | * | 11/2000 | Marko et al. | 370/321 |
| 6,198,921 | * | 3/2001 | Youssefzadeh et al. | 455/428 |

* cited by examiner

MOBILE SATELLITE SYSTEM AND METHOD FOR IMPLEMENTING A SINGLE-HOP TERMINAL-TO-TERMINAL CALL

This application is a continuation-in-part of U.S. patent application Ser. No. 09/115,098, filed by Chandra Joshi et al. on Jul. 13, 1998 and claims priority to U.S. Provisional patent application Ser. No. 60/110,253 of Chandra Joshi et al., filed Nov. 30, 1998, for "A Method for Implementing a Terminal-To-Terminal Call in a Geo-Stationary Orbit Mobile Satellite System", both of the applications being incorporated herein by reference.

CROSS REFERENCE TO RELATED APPLICATIONS

Related subject matter is disclosed and claimed in co-pending U.S. patent application Ser. No. 09/247,845, filed by Chandra Joshi et al. on Feb. 11, 1999, for "A Method for Implementing a Terminal-To-Terminal Call With Optimal Use of Radio Resources In A Mobile Satellite System" and in co-pending U.S. patent application Ser. No. 09/247,848, filed by Chandra Joshi et al. on Feb. 11, 1999, for "A Method for Implementing Ciphered Communication for Single-Hop Terminal-To-Terminal Calls in a Mobile Satellite System" both of said applications being expressly incorporated herein by reference.

FIELD OF THE INVENTION

The invention relates to a system and method for implementing a single-hop terminal-to-terminal call in a mobile satellite system and maintaining a signaling path between the mobile terminals and a gateway station during the terminal-to-terminal call.

BACKGROUND OF THE INVENTION

A number of systems exist which provide both mobile terrestrial communication (ie., cellular communication) and mobile satellite communication between terminals. Such a system is hereinafter referred to as an MSAT system. Satellite communication between two terminals is typically implemented via a double-hop, that is, two signal paths. One signal path is from an originating terminal to a ground station via a satellite, and the other signal path is from the ground station to a destination terminal via the satellite. A single-hop, one-way propagation delay can occur which can be on the order of 270 milliseconds (ms). Thus, in a double-hop MSAT system, the propagation delay can be on the order of 540 ms, which can create unacceptable interruptions during calls, particularly voice calls.

A number of single-hop MSAT systems exist; however, these single-hop systems are disadvantageous because signaling paths are terminated once a single-hop satellite signal path is established for a call between two terminals. Without a signaling path during the terminal-to-terminal (TtT) call, no services such as ciphering key exchanges for encryption can be offered within the MSAT system. Thus, callers cannot be guaranteed their privacy during calls within the single-hop MSAT system. A need therefore exists for a single-hop MSAT system which maintains a signaling path during a TtT call for services such ciphering for privacy, among others.

SUMMARY OF THE INVENTION

In accordance with an aspect of the present invention, an MSAT system 10 is provided in which single-hop TtT calls can be established. A signaling path is maintained between both the originating terminal and the destination terminal and a gateway station. Thus, a mobile switching center (MSC) can send messages to a terminal via the signaling path when the voice path from the MSC to the terminal is blocked by the satellite in single-hop mode.

In accordance with another aspect of the present invention, the switch interface between gateway station controllers in a gateway station and a GSM-based mobile switching center (DSC) of an MSAT system uses minimal modifications to support single-hop satellite communications with signaling during a TtT call.

In accordance with another aspect of the present invention, an originating terminal and a destination terminal establish radio frequency communication links with at least one gateway station for call establishment. The gateway station assigns satellite channels for communication between each terminal and its corresponding gateway station and allocates satellite channels for a direct satellite link between the terminals and for signaling between each terminal and its corresponding gateway station during a single-hop terminal-to-terminal call.

In accordance with yet another aspect of the present invention, when the originating gateway station differs from the destination gateway station, the originating terminal is reregistered with the destination gateway station. The satellite channels allocated to the originating terminal for the call path and signaling during the terminal-to-terminal call are provided to the destination gateway station.

In accordance with yet another aspect of the claimed invention, a verification signal is transmitted between the terminals via the direct satellite link to verify that it has been established. The verification signal is formatted such that the gateway stations disregard the signal.

In accordance with still yet another aspect of the claimed invention, each gateway station has a traffic control subsystem for managing the allocation of satellite resources to the gateway station. The traffic control subsystems at different gateway stations communicate with each other via an intranetwork communication system. During a terminal-to-terminal call, a destination gateway station can send signals to the originating terminal via the intranetwork communication system and the satellite channels allocated to the originating terminal for signaling.

In accordance with another aspect of the present invention, the system can proceed to implement a double-hop call between the terminals via earlier assigned satellite channels when the direct satellite communication link or associated signaling path fails.

BRIEF DESCRIPTION OF DRAWINGS

The various aspects, advantages and novel features of the present invention will be more readily comprehended from the following detailed description when read in conjunction with the appended drawings, in which.

Throughout the drawing figures, like reference numerals will be understood to refer to like parts and components.

DETAILED DESCRIPTION OF THE PREFERRED EMBODIMENTS

Figure 1:
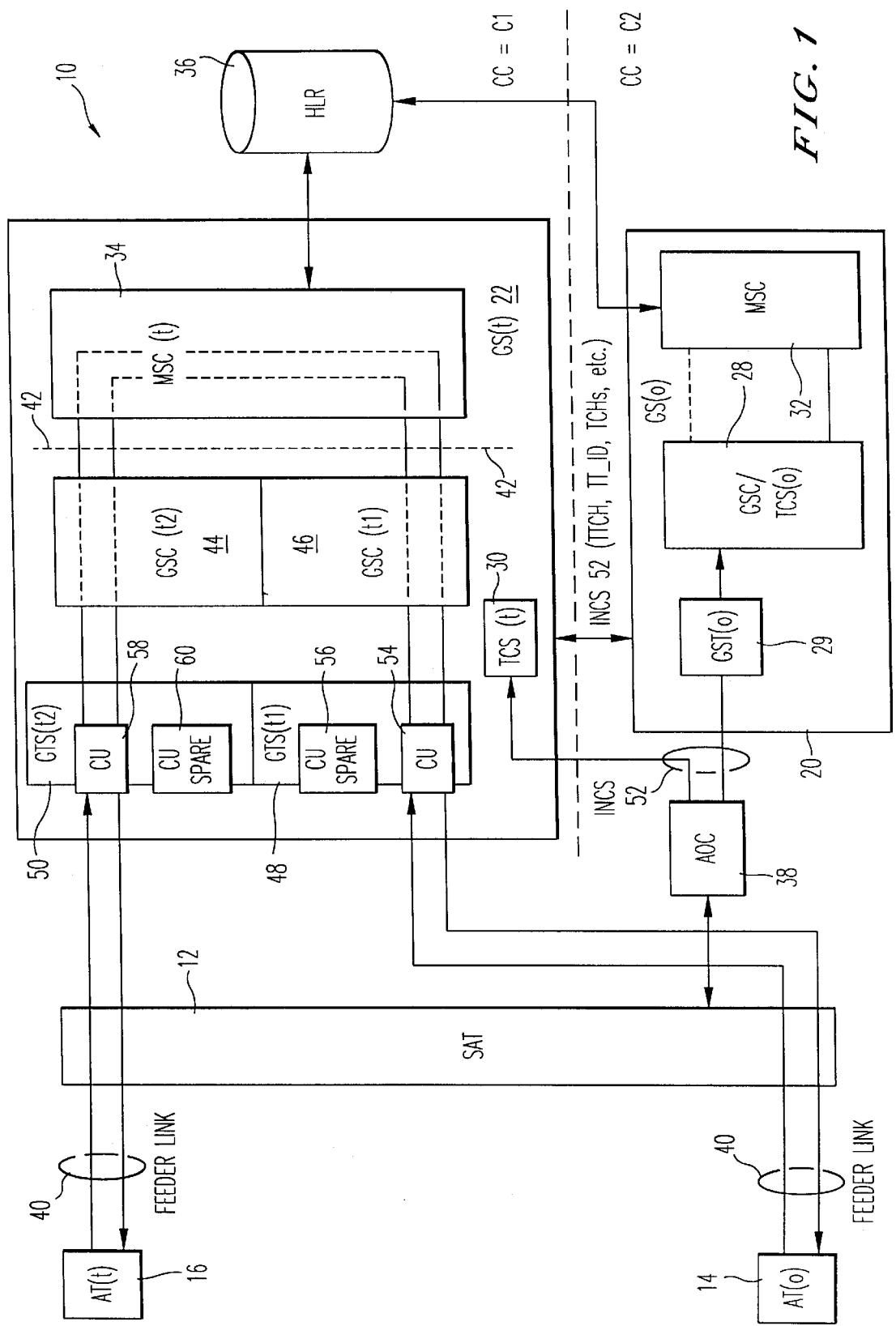
FIG. 1 is a block diagram of an MSAT system constructed in accordance with an embodiment of the present invention.

An MSAT system 10 constructed in accordance with the present invention is depicted in FIG. 1. The MSAT system 10 is a fully integrated digital mobile communications network which. is interoperable with terrestrial cellular networks. The MSAT system 10 comprises at least one satellite 12 which preferably a geosynchronous satellite. While only one satellite is shown, it is to be understood that additional satellites can be used in the MSAT system 10.

The MSAT system 10 provides an open common air interface to allow access terminals such as AT(o) 14 and AT(t) 16 to communicate via the satellite 12. The air interface 40 can be, for example, an L-band mobile radio link. The access terminals (ATs) can be hand-held terminals, vehicular terminals or fixed terminals. In addition, the ATs can be dual-mode terminals to operate in either of the MSAT system or a Global System for Mobile Communications or GSM-standard digital cellular system. The MSAT system 10 provides subscriber services that are essentially those services available from a GSM-based digital cellular system, including voice, data, facsimile, voice mail and short message service, among other services.

With continued reference to FIG. 1, the MSAT system 10 further comprises a number of gateway stations (e.g., GS(o) 20 and GS(t) 22). The gateway stations (GSs) provide an interface between the public switched telephone network (PSTN), the public land mobile network (PLMN), and the public switched data network (PSDN) and the ATs using the satellite 12 as repeater. As stated previously, the GSs also have interfaces for cooperating cellular networks for interoperability. Thus, ATs communicate over the satellite with devices in the PSTN, PLMN and the PSDN via GSs and with each other under the control of GSs, as described in further detail below. The GSs preferably communicate via C-band satellite links. Single-hop and double-hop mobile TtT calls via the satellite are preferably implemented via L-band paths. For a single-hop direct connection or TtT call between access terminals, a cross-connected pair of L-band channels are used and are hereinafter referred to as an L-L link.

A satellite operations center (not shown) provides satellite telemetry, command and ranging and payload housekeeping functions. An advanced operations center (AOC) 38 communicates with the satellite operations center, as well as with the GSs. Each GS manages a subset of the satellite resources (i.e., switched channels) and can request additional resources from the AOC 38 as required.

The MSAT system 10 of the present invention is described below in accordance with the following general outline:

| | |
|---|---|
| 1. | System Architecture |
| 2. | Time Synchronization |
| 2.1 | TtG/GtT Call |
| 2.1.1 | Initial Access |
| 2.1.2 | Transition from Channel to Another Channel |
| 2.1.3 | During The Call |
| 2.2 | TtT Call with Two GSs |
| 2.2.1 | Initial Access |
| 2.2.2 | Transfer AT(o) from GS(o) to GS(t) |
| 2.2.3 | Transition to TtT Channel Configuration |
| 2.2.3.1 | Originating Side |
| 2.2.3.2 | Terminating Side |
| 2.2.4 | During the TtT Call |
| 3. | Single-Hop Call Establishment |
| 3.1 | TtT Call Between ATs Registered at Different GSs |
| 3.1.1 | Call Establishment Procedure - Originating Side |
| 3.1.1.1 | GS Selection/Radio Resource Allocation |
| 3.1.1.2 | Registration/Authentication of AT(o) with GS(t) Authentication Ciphering TMSI Allocation |
| 3.1.1.3 | Call Control Procedure |
| 3.1.2 | Call Establishment Procedure - Terminating Side |
| 3.1.2.1 | Radio Resource Allocation |
| 3.1.2.2 | Authentication and L-L Connection Authentication Ciphering L-L Connection |
| 3.1.2.3 | Call Control Procedure |
| 3.1.3 | End-to-End Voice Path |
| 3.2 | TtT Call Between ATs Registered at the Same GS |
| 3.3 | Incomplete Call Conditions |
| 3.3.1 | No Response from AT(t) |
| 3.3.2 | Terminating Side Busy |
| 3.3.3 | Terminating Side Does Not Answer |
| 3.3.4 | TTCH Assignment Failure |
| 3.3.4.1 | TTCH Assignment Failure on Terminating Side |
| 3.3.4.2 | AT(o)-AT(t) Communication Link Fails |
| 3.3.4.3 | TTCH Assignment Failure on Originating Side |
| 3.3.5 | Other Failure Conditions |
| 3.4 | Call Release Procedures |

1. System Architecture

The MSAT system 10 architecture is based on the GSM standard. Each GS preferably comprises at least one gateway station controller (GSC), a traffic control subsystem (TCS), and at least one gateway transceiver station (GTS). For illustrative purposes, an originating GS (i.e., GS(o) 20) comprises a GSC and a TCS which are hereinafter referred to as GSC(o) and TCS(o), respectively, and which are indicated generally at 28 in FIG. 1. The GS(o) also comprises a transceiver GTS(o) 29 and a mobile switching center (MSC) 32. A terminating GS (i.e., GS(t) 22) comprises two GTSs, that is, GTS(t1) 48 and GTS(t2) 50, as well as two GSCs hereinafter referred to as GSC(t1) 46 and GSC2) 44. The GSC(t1) 46 and GSC(t2) operate in conjunction with an MSC 34. Both of the MSCs 32 and 34 communicate with a home location register HLR) 36 which operates in a conventional manner. The GSC and GTS manage an interface (i.e., an A interface 42) toward a MSC. The GTS provides the common air interface 40 with the ATs. The TCS provides for the allocation/deallocation of the radio resources to the AT via communication with the GSC/GTS. The TCS can support a number of GSCs in a GS, as illustrated in FIG. 1, by the TCS(t) 30 and the GS(t) 22 which comprises GSC(t1) 46 and GSC(t2) 44.

Figure 2:
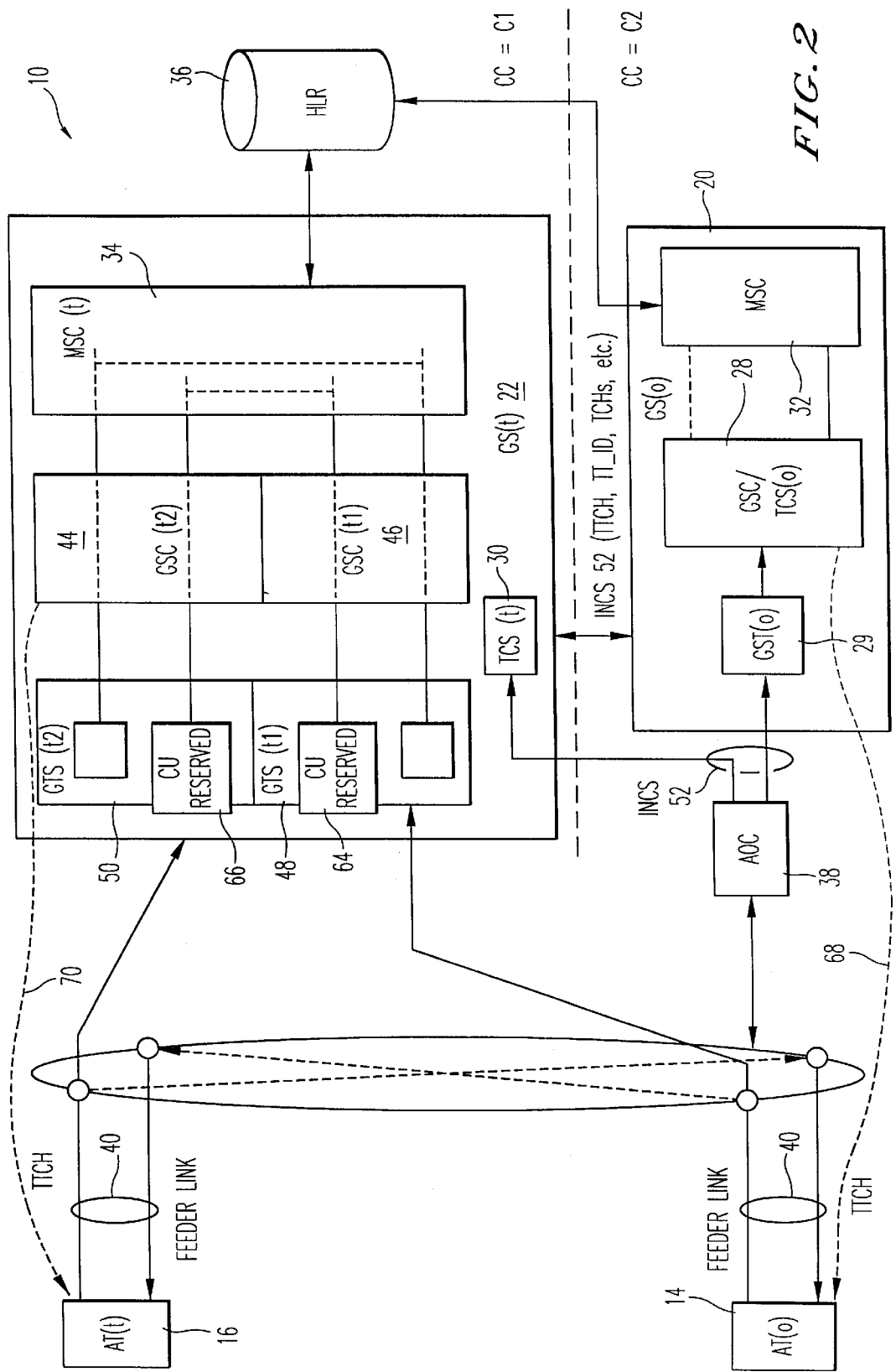
FIG. 2 is a block diagram of an MSAT system for implementing a TtT single-hop call in accordance with an embodiment of the present invention.

FIG. 1 illustrates channel units 54 and 58, as well as spare channel units 56 and 60, in the GTS(t1) 48 and GTS(t2) 50, respectively. Each channel unit (CU) represents a channel through which an AT communicates with the GS(t) 22. FIG. 2 is substantially the same as FIG. 1, except a reserved CU 64 is used by the AT(o) 14 and a reserved CU 66 is used by the AT(t) 16. FIG. 2 depicts the MSAT system 10 during a single-hop TtT call, as opposed to the double-hop mode depicted in FIG. 1. As illustrated in FIG. 2, communication of the MSC(t) 34 with the AT(o) 14 and the AT(t) 16 is blocked during a TtT call. As will be discussed in further detail below, the GS(o) 20 and the GS(t) 22 are operable in accordance with the present invention to assign signaling channels (TTCH) 68 and 70 with which these GSs can communicate with their respective ATs during a single-hop TtT call. The allocation of satellite resources by the AOC and GSs is communicated via an intranetwork communication system (INCS) 52.

As stated previously, a TtT call in the MSAT system 10 can be established in either single-hop mode or double-hop mode. The single-hop mode call is preferably only established for a voice call since the aforementioned propagation delay can degrade voice calls. In this mode, two ATs engaged in a voice call communicate directly via satellite 12 on a circuit-switched L-L channel at the satellite 12. The TtT double-hop mode call is established between two ATs for data, facsimile, and some voice calls when the ATs are in geographically restricted positions. The MSAT system supports two types of TtT double-hop calls, that is, when only one GS is in use and both ATs are registered at this GS, and when two GSs are in use and each AT is registered at a different GS. The MSAT system 10 supports a single-hop call for terminals even if both of the terminals are roaming in the MSAT system. One or two GSs will establish two independent connections with each AT by using two independent ciphering keys (Kc1, Kc2). The terminating GSC(t) initiates a procedure for early assignment of traffic channels to terminals. In this procedure, the GSC(t) requests the AOC 38 to cross-connect a new pair of L-L channels at the satellite 12 for establishment of a single-hop AT-AT call in the network On completion of the L-L switchover procedure, the GSC(o) 28 and the GSC(t1) 46 initiate a subsequent terminal-to-terminal channel (TTCH) assignment procedure, which includes the transfer of the common ciphering key (Ktt), assignment of the TTCH and L-L channels (i.e., traffic channels or TCHs) connected at the satellite 12 to both ATs and the GSs and additional parameters for the ciphering synchronization. On successful completion of the TTCH assignment procedure, a single-hop voice call is established. The AT and corresponding GS begins to perform the signaling, power control, and timing correction for the call over the assigned channel (i.e., the TTCH and the traffic channel [TTCH]).

The MSAT system 10 establishes a single-hop call between two ATs for a voice call if both ATs are registered at the same MSC. In this mode of operation, certain supplementary services (SS) and all of the short message services (SMS) (e.g., mobile-originated and mobile-terminated services) are blocked by the MSC. During establishment of a single-hop voice call, if, for some reason, the MSAT system network element (e.g., GSC/TCS/AOC) fails to cross-connect two ATs at the satellite 12, the call is handled as a double-hop call, (i.e., two ATs communicate via same MSC but with two satellite 12 hops). In this case, the MSC still considers the call a single-hop call and continues to block certain supplementary services and all the SMS. In other cases such as data, facsimile, and alternate voice/ facsimile calls, the TtT call remains in a double-hop mode, even if both ATs are registered at the same MSC. The MSC supports all the SS and SMS in a standard GSM manner.

The MSAT system 10 architecture preferably includes four interfaces, including the air interface 40, the GTS/GSC interface (e.g., a bis interface), the GSC-TCS interface, and the A interface 42. The MSAT system operations are divided among the ATs, the GSs, and the MSCs.

Figure 3:
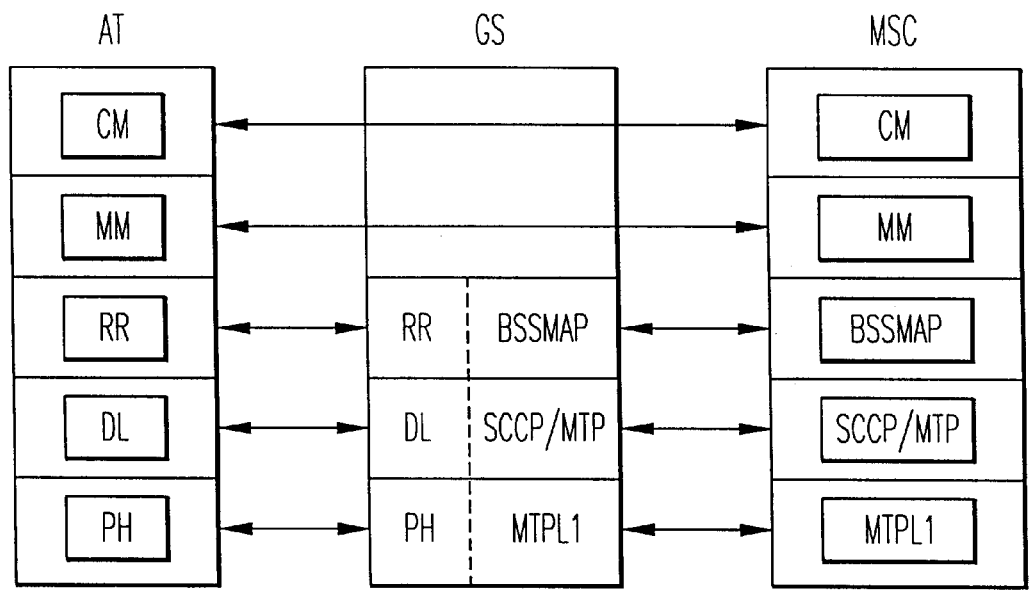
FIG. 3 illustrates protocol stacks between a mobile terminal, a gateway station and a mobile switching center in accordance with an embodiment of the present invention.

The MSAT system 10 employs an air interface 40 protocol to define operation procedures between an AT and the network provided by the MSAT system The air interface 40 protocol is preferably a modified version of the GSM-defined air interface 40. With reference to FIG. 3, the physical layer (PH) describes the various types of bursts used to transfer the information with the least bit error rate. The data link layer (DL) describes the reliable transmission of the information and data link error recovery procedure. The MSAT radio resources layer (RR) describes the idle mode behavior, dedicated mode behavior of the terminal, and allocation/reallocation of the radio resources for AT-AT and AT-PSTN communication during normal call, as well as optimal routing. The changes at the MSAT upper layers, (e.g., the mobility management layer (MM) and the call management layer (CM)) are minimal.

The GSC-MSC interface describes the protocols between an MSC and a GSC, as shown in FIG. 3. This interface is known as the MSAT A-interface 42. This protocol is a modified version of the GSM-defined A-interface 42. The MSAT system A-interface 42 performs, in addition to GSM features, the MSAT network functions that are not supported by the GSM such as high-penetration alerting (HPA), optimal routing, and single-hop AT-AT calls.

The TCS/GSC interface provides for the allocation/ deallocation of the dedicated channels during AT-PSTN and AT-AT calls. This interface also describes the call routing from one GSC/TCS to another GSC/TCS via the INCS 52 during a TtT call.

Figure 4:
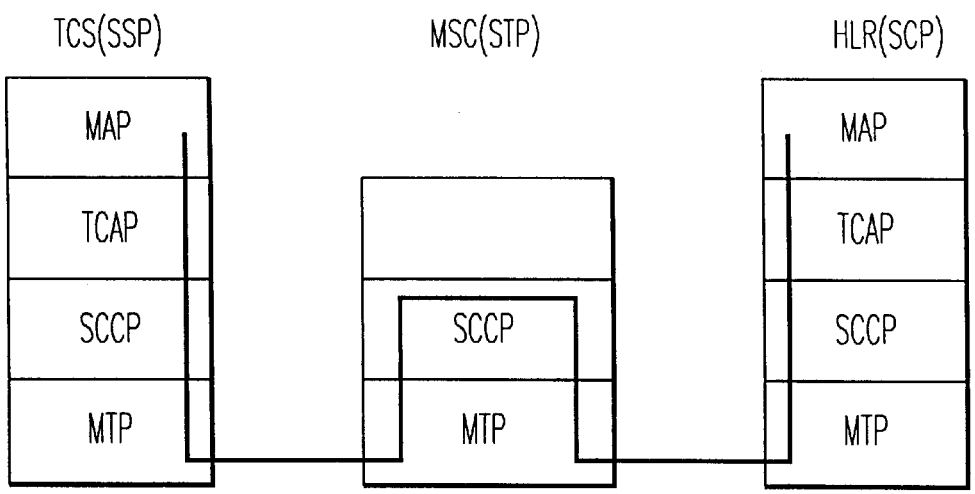
FIG. 4 illustrates protocol stacks between a traffic control system in a gateway station, a mobile switching center and a home location register in accordance with an embodiment of the present invention.

FIG. 4 depicts a TCS-HR interface. The TCS requires an interface that allows access to a signaling system 7 (SS7) backbone network in order to be able to retrieve information from an HLR, for example, the MSAT system HLR and that of cooperating network (i.e., GSM HLRs). The TCS uses this interface to retrieve the MSC/visitor location register (VLR) address at which the destination AT is currently located. The GSM-based any time interrogation (ATT) or standard SMS-SRI mobile application protocol (MAP) procedures (GSM 09.02) are used to determine the location of the destination AT.

With continued reference to FIG. 4, the TCS functions as a service switching point (SSP), while the HLR functions as a service control point (SCP). The interrogation messages exchanged between the TCS and the HLR 36 makes use of SS7 and the physical interface between the TCS and its adjacent MSC. The MSC performs the signaling transfer point (STP) function into the SS7 backbone network that interconnects the MSAT system GS. An HLR 36 is preferably provided at each of GSs. As an STP, the MSC routes the HLR interrogation messages received from the TCS to the destination HLR The routing function performed by the MSC adjacent to the TCS is accomplished via the Message Transport (MTP) Layer 3 and signaling connection control port (SCCP) layers. The SS7 backbone network that interconnects the MSAT system GSs can be a national network The TCS is not directly connected to the SS7 network, so it is not subject to the SS7 implementation (country) variants.

With regard to the TCS-AOC-satellite payload processor interface, when the AOC 38 receives a TtT (L-L channel)

connection request from the TCS during normal operation, the AOC performs validity and authorization checks on the subbands, carriers, and timeslots specified in the connection request. If the request passes these checks, then the AOC 38 passes on the connection request to the satellite 12 payload processor and, on the acknowledgment of that request from the satellite 12 payload processor, sends a response to the TCS that the connection request was successfully received. If the request fails the required checks, then the AOC 38 generates the appropriate failure code in the acknowledgment message it sends to the TCS and does not pass on the request to the satellite 12 payload processor.

When the AOC 38 receives a TtT (L-L channel disconnect request from the TCS, it performs validity checks on the subbands carriers, and timeslots specified in the disconnect request. If the request passes the validation checks, then the AOC 38 passes on the disconnection request to the satellite 12 payload processor. The AOC 38 receives an acknowledgment of the disconnect request from the satellite 12 payload processor followed by a disconnect response message stating whether the L-L channels were disconnected at the satellite 12. The AOC 38 then sends a disconnect response to the TCS indicating whether the L-L channels disconnection was made at the satellite 12 payload processor. Based on the response it receives from the AOC, the TCS knows whether the resources can be relinquished and reallocated to subsequent TtT connection requests.

There are two channels that the AOC 38 uses to send TtT commands up to the satellite 12 payload processor. Connect requests are sent on one channel, disconnect commands on the other channel. Each command has a one-up sequence number, which is unique to that channel. The AOC 38 takes advantage of two counters for the disconnect channel in the satellite 12 payload processor to find out whether or not a disconnect message has been received. The Command Processed Count is incremented every time a valid command is received. The Next Expected Sequence Number is equal to the sequence number of the last valid command received plus one. Both of these values are telemetered periodically to the AOC. If no commands have been lost, the difference between the current and the previous values of Next Expected Sequence Number should equal the Command Processed Count. If there is a discrepancy, all of the disconnect messages, starting with the previous Next Expected Sequence Number, are retransmitted to the satellite 12 payload processor. Thus, the AOC 38 and the satellite 12 payload processor remain in synchronization.

Power control in a TtT call is similar to that of a terminal-to-gateway/gateway-to-terminal (TtG/Gtl) call Power control operates according to the values given to a number of operating parameters. The values of the operations parameters are established before the implementation of power control. For both TtT and non-TtT calls, most of the power control parameters are broadcast for all ATs. Some of the parameters specific to an AT, or to a call, are transmitted to the corresponding AT as a message. In a TtT call, a closed loop power control is applied in the same way as in a non-TtT call, with the regular exchange of power control messages between two ATs. One AT acts as the network with regard to power control to simulate a TtG/GtT call. AT/network configuration can be readily achieved as a by-product of ciphering synchronization when the configuration is designated in an ASSIGNMENT COMMAND 2 before the L-L communication begins. The initialization parameters for a TtT call are transmitted to each AT in the ASSIGNMENT COMMAND 2. The closed loop power control between two ATs begins after the L-L link 62 is assigned to both ATs 12 and 16. The synchronization of power control messages between two ATs in a TtT call is the same in a normal TtG/GtT call with one AT acting as the network.

2. Time Synchronization

An AT transmits signals that are time-aligned and frame number-aligned with the system timing on the satellite 12. The entire system is preferably time synchronized at the satellite 12. The basic operation of time synchronization for a TtG/GtT call is provided in the following section before discussing the TtT call.

2.1. TtG/GtT Call

The AT timing alignment is achieved by correcting transmission timing with factors provided by a GS. Transmission at a random access channel (RACH) is corrected with factors provided over the BCCH Transmission at a traffic channel (TCH) or a standalone detached control channel (SDCCH) is corrected with factors given over the access grant channel (AGCH). Timing correction update messages are transmitted to the AT by the GS whenever the AT is instructed to switch from one channel to another (e.g., from a SDCCH to a TCH). The AT applies the correction to the new channel. During a call, timing correction is provided by fast access control channel (FACE for transmission at TCH3 and by SACCH for transmission at TCH6/TCH9.

2.1.1 Initial Access

At initial access, an AT accesses the network provided by the MSAT system 10 using a RACH offset designed for the spot beam center. The RACH offset is distributed from the network through the BCCH in each spot beam, and it is available at the AT soon after the BCCH is decoded. The round-trip delay variation due to the difference between the current AT position and the beam center is detected by the GS when it receives the RACH message. This timing difference is equal to 2(Ta−To), where To is the propagation delay from the satellite 12 to the beam center and Ta is the propagation delay from the satellite 12 to the AT. This value is passed to the AT through an IMMEDIATE ASSIGNMENT message via an AGCH. The AT then offsets its transmission by this correction factor and the return link timing synchronization from the AT to the GS is achieved at this point.

2.1.2 Transition from Channel to Another Channel

If the AT is assigned a SDCCH for call set-up signaling, the updates of time correction factors are transmitted to the AT when the TCH assignment is performed. The AT then applies the correction to its transmission in the new channel.

2.1.3 During the Call

In the forward link, an open loop synchronization scheme is employed. The AT receiver timing is maintained by using its internal time base and frequently corrected by position detection of the received TCH or dual keep-alive burst (DKAB) bursts to take care of any possible timing drift caused by the AT oscillator and by the AT-satellite relative motion.

In the return link a closed-loop synchronization scheme is used. Any transmission timing drift from the AT transmitter is detected by the GS by comparing the actual burst arrival with the expected burst arrival. A timing correction is passed to the AT if the timing error exceeds a predefined threshold.

2.2 TtT Call with Two GSs

With continued reference to FIG. 1, the originating AT(o) 14 is initially registered at a gateway station GS(o) 20 which is different from the GS(t) 22 where the terminating AT(t) 16 is initially registered The AT(o) 14 communicates with the GS(o) 20 initially and then with the GS(t) 22 after the AT(o) 14 receives timing correction from the GS(o) 20. After the initial access and after the signaling is complete, the downlink channel TTCH 68 from the network (i.e., the MSAT 10) to the AT(o) 14 comes from GS(o) 20 instead of GS(t) 22 to which the AT(o) is transmitting, as illustrated in FIG. 2 and in accordance with the present invention.

While there are only two main time synchronization stages in a TtG/GtT call, a TtT call with two GS has the following four main time synchronization stages: (1) initial access; (2) transfer of the AT(o)'s communication from the GS(o) 20 to the GS(t) 22; (3) transition to TtT channel configuration; and (4) during the TtT call. It is to be understood that the events at these four stages do not necessarily occur sequentially in the order given. For example, the AT(t) 16 does not perform the initial access at the same time as the AT(o) 14 and it occurs after the second stage. Also, stage (2) preferably applies only to the AT(o) 14.

2.2.1 Initial Access

Figure 5:
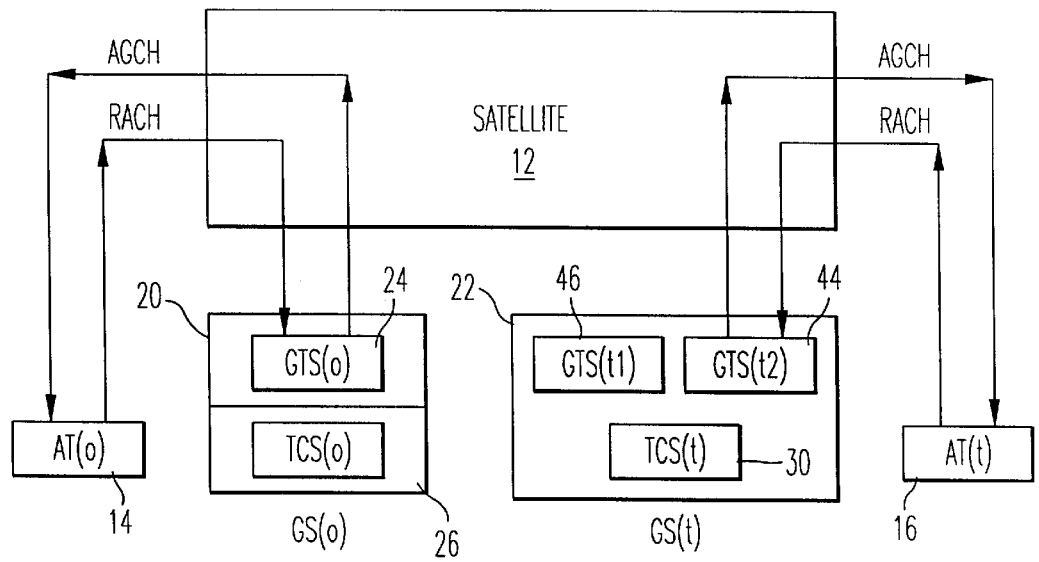
FIG. 5 is a block diagram illustrating an MSAT system during an initial access stage in accordance with an embodiment of the present invention.

Time synchronization between the AT(o) 14 and the GS(o) 20, and between the AT(t) 16 and the GS(t) 22 during initial access for a TtT call is the same as for a regular TtG/GtT call. System configuration at initial access synchronization is shown in FIG. 5. The initial access between the AT(o) 14 and GS(o) occurs at the beginning of the TtT call, but the initial access between the AT(t) 16 and GS(t) is performed when the AT(t) 16 is paged by GS(t), as discussed below in connection with FIG. 8.

2.2.2 Transfer AT(o) from GS(o) to GS(t)

Figure 6:
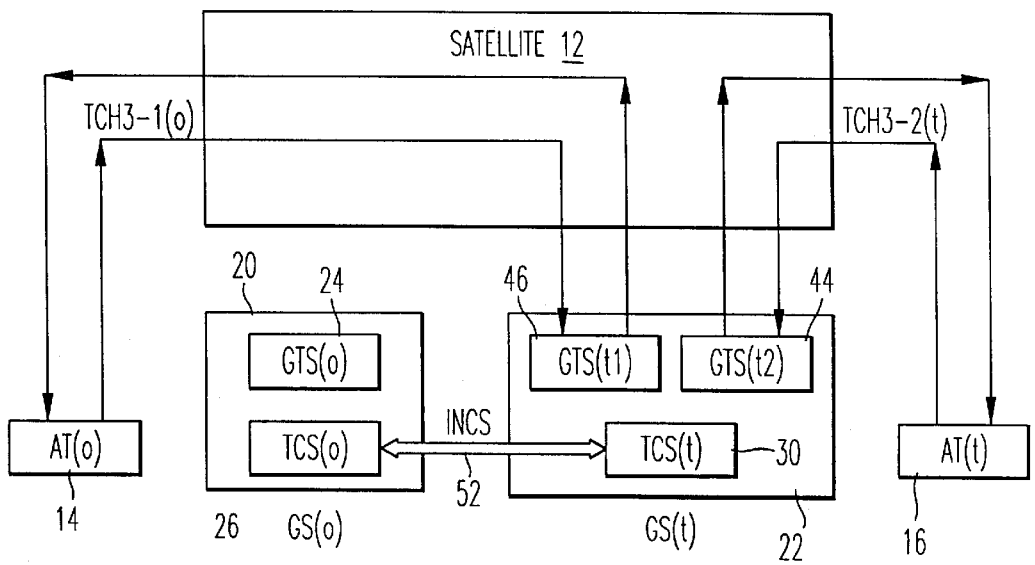
FIG. 6 is a block diagram illustrating an MSAT system for establishing satellite traffic channels in accordance with an embodiment of the present invention.

Because, in a TtT call, both ATs have to be registered at the same GS (e.g., the GS(t) 22) after initial access, the AT(o) 14 has to reregister at the GS(t). Therefore, although the AT(o) 14 receives timing correction from GTS(o) and gets synchronized with GTS(o) after the initial access, the AT(o) 14 has to start communication with GTS(t1) after it receives an IMMEDIATE ASSIGNMENT message from the GS(o) 20 which is also discussed in connection with FIG. 6. FIG. 6 shows the channel configuration after the AT(o) 14 is transferred to the GS(t) 22, and the AT(t) 16 has commenced communication with GS(t). TCH3-1 (o) and TCH3-2 (t) correspond to the first traffic channels (i.e., TCH3s) assigned to the AT(o) 14 and the AT(t) 16 in the IMMEDIATE ASSIGNMENT procedure. A synchronization procedure can be employed to correct any timing drift between the two GS 20 and 22.

2.2.3 Transition to TtT Channel Configuration 2.2.3.1 Originating Side

Figure 7:
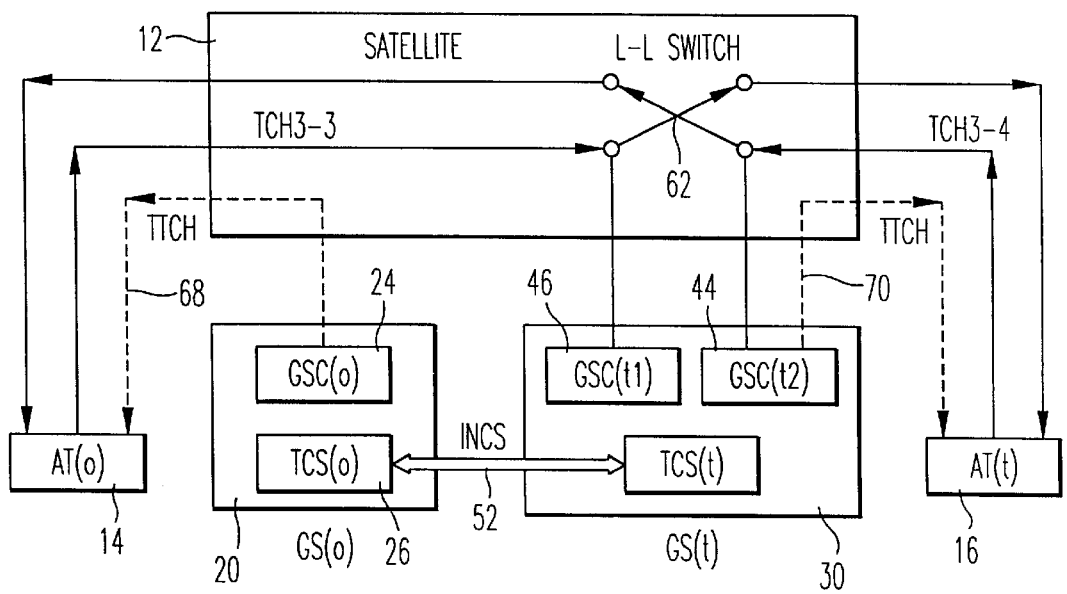
FIG. 7 is a block diagram illustrating an MSAT system implementing a terminal-to-terminal (TtT) single-hop call with signaling paths in accordance with an embodiment of the present invention.

It takes approximately 15 seconds from the time the AT(o) 14 is assigned the TCH3 channel for call-setup signaling to the time the AT(o) 14 is assigned an L-L channel and a TTCH channel. During this time period, the AT may have a time drift with respect to the GS. A synchronization procedure can be employed to correct for time drift. After TCS(t) receives a L-L Connect Acknowledgment from AOC, it performs the subsequent TtT channel assignment (TTCH 68 assignment) to the AT(o) 14. The assignment includes an L-L link (a TCH3 for cross-connection at the satellite 12) and a TTCH 68. The L-L link is for the communication between the AT(o) 14 and the AT(t) 16, as well as for the transmission from the AT(o) 14 and the AT(t) 16 to the corresponding GS(o) 20 and GS(t) 22. A TTCH is used by a AT to receive from its GS. Thus, each AT is receiving signals through the L-L TCH3 channel from the AT and through the TTCH channel from its initial GS, while each AT is transmitting signals through the same L-L TCH3 both to the other AT and to the GS being used after the TTCH assignment (e.g., GS(t) 22), as shown in FIG. 7. The ASSIGNMENT COMMAND 2 message is sent at the TtT channel assignment and contains new timing correction to be applied to the new channel.

After the channel assignment, the AT(o) 14 performs the link establishment procedure with the GSC(t1) 46. The transmission from the AT(o) 14 to GSC(t1) is on the assigned L-C link, as shown in FIG. 7. The transmission from the GSC(t1) 46 to AT(o) 14 is first from the GSC(t1) 46 to GSC(o) 44 through INCS 52 and then from GSC(o) to the AT(o) 14 is through the TTCH 68. The AT(o) 14 then waits to communicate with the AT(t) 16 through the assigned L-L link 62 until the AT(t) 16 is assigned the TtT channel. AT(o) 14 does not receive any signal on the L-L link from the time it is assigned the L-L link to the time it receives a link establishment message (i.e., a set synchronous balance mode (SABM) message with a service access point indentifier (SAPI 2)) from the AT(t) 16. This period lasts for approximately 2–4 seconds.

2.2.3.2 Terminating Side

AT(t) remains on the TCH3 channel (i.e., TCH3-2(t) in FIG. 6) assigned in the IMMEDIATE ASSIGNMENT for signaling for about 10 seconds before it is assigned a new L-L link and a TTCH channel. During this time period, the AT may have a time drift with respect to the GS. A synchronization procedure can be employed and compensate for this time drift. After the GSC(t2) 44 receives both the request to initiate the TTCH assignment procedure on the terminating side from the TCS(t) 30 and the Assignment Request from MSC, it performs the TtT channel assignment procedure to the AT(t) 16. When the AT(t) 16 receives ASSIGNMENT COMMAND 2, it initiates the link establishment with GSC(t2). The AT(t)-to-GSC(t2) direction is on the assigned L-C channel and the other direction is on the TTCH from GS(t) 22. Timing correction is also given in the ASSIGNMENT COMMAND 2 message to the AT(t) 16 to be applied to the new channels. The AT(t) 16 also initiates the link establishment procedure (i.e., SABM/UA messages) with the AT(o) 14 on the L-L link using SAPI 2, as described below in connection with FIG. 8. After successful link establishment between the AT(o) 14 and the AT(t) 16, direct communication between the AT(o) 14 and the AT(t) 16 begins on the L-L channel 62.

2.2.4 During the TtT Call

Similar to a TtG/GtT call, open loop synchronization is employed for AT receivers while dosed loop control is applied to AT transmitter. The control loop for the AT(o) 14 is an AT(o) transmitter-[L-C link]-GTS(t1)-[INCS 52]-GTS (o)-[TTCH]-AT(o) transmitter and the control loop for AT(t) transmitter is AT(t) transmitter-[L-C link]-GTS(t2)-[TTCH]-AT(t) transmitter. The TTCH reception is used to control the terminal perspective of timing. This basis is used for the transmission of the TCH. The received TCH is separately tracked using offsets from the TTCH-based observation. In addition, any timing drift of an AT transmitter is corrected by Timing Correction messages from the GS(t) 22 through the TTCH channel. The GTS(t1) 46 and the GTS(t2) 44 monitor the actual time of TCH burst arrival through the L-C link. If the timing error is found to be over the prespecified threshold, a timing correction message is transmitted to the AT on the TTCH.

3. Single-Hop Call Establishment

The following subsections describe the information flow, number of network elements, and radio resources used to establish a single hop call in the MSAT system 10 of the present invention. The information flow describes the major sequence of events for a TtT call in the MSAT system 10. The TtT call in the MSAT system 10 is treated as a combination of AT-PSTN and PSTN-AT calls. Further, in the MSAT system TtT call, the described procedures are preferably executed one after the other, as opposed to simultaneous execution.

3.1 TtT Call Between ATs Registered at Different GSs

Figure 8A:
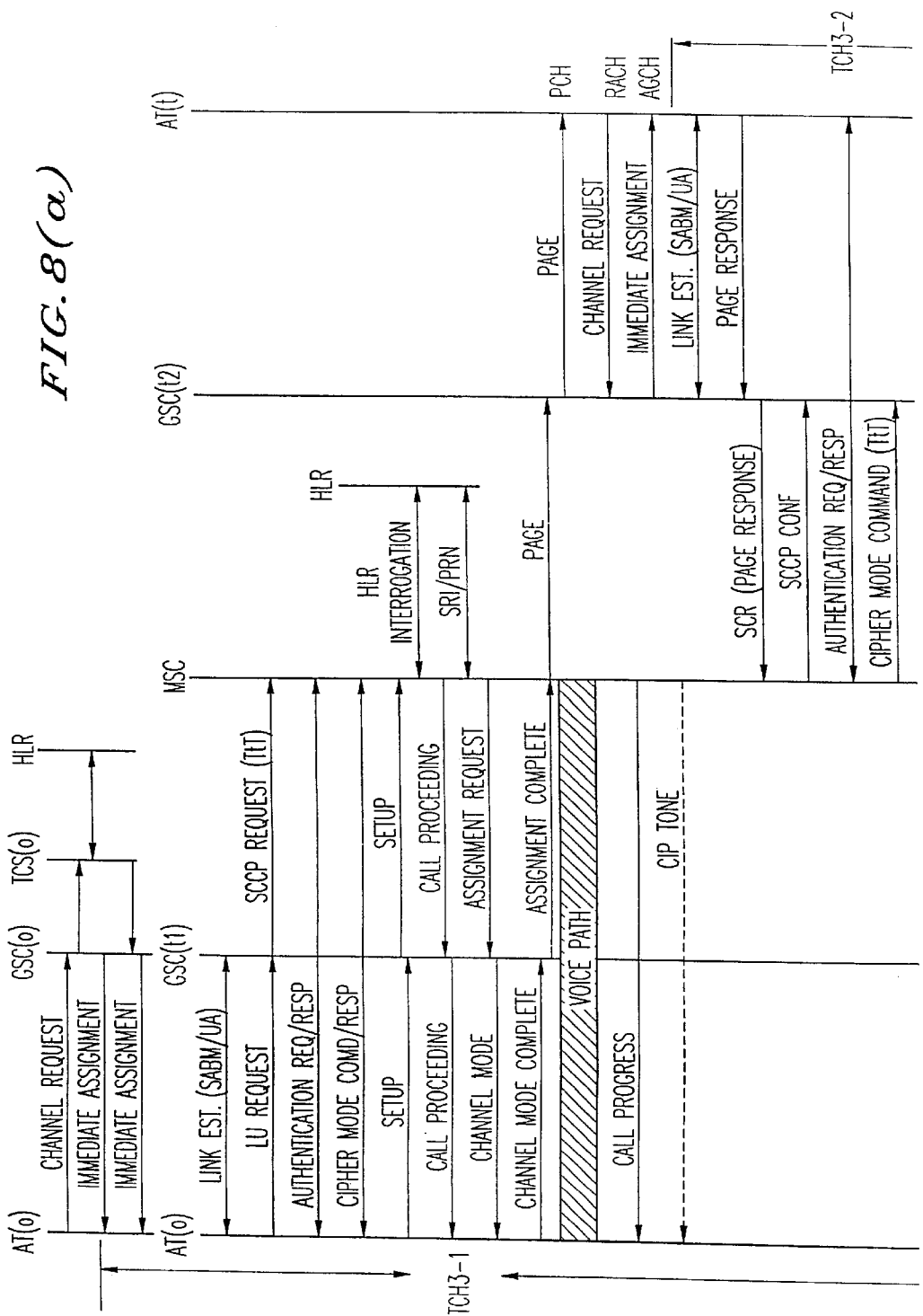
FIG. 8 illustrates signals transmitted between MSAT system components to implement a single-hop TtT call with signaling paths in accordance with an embodiment of the present invention.
Figure 8B:
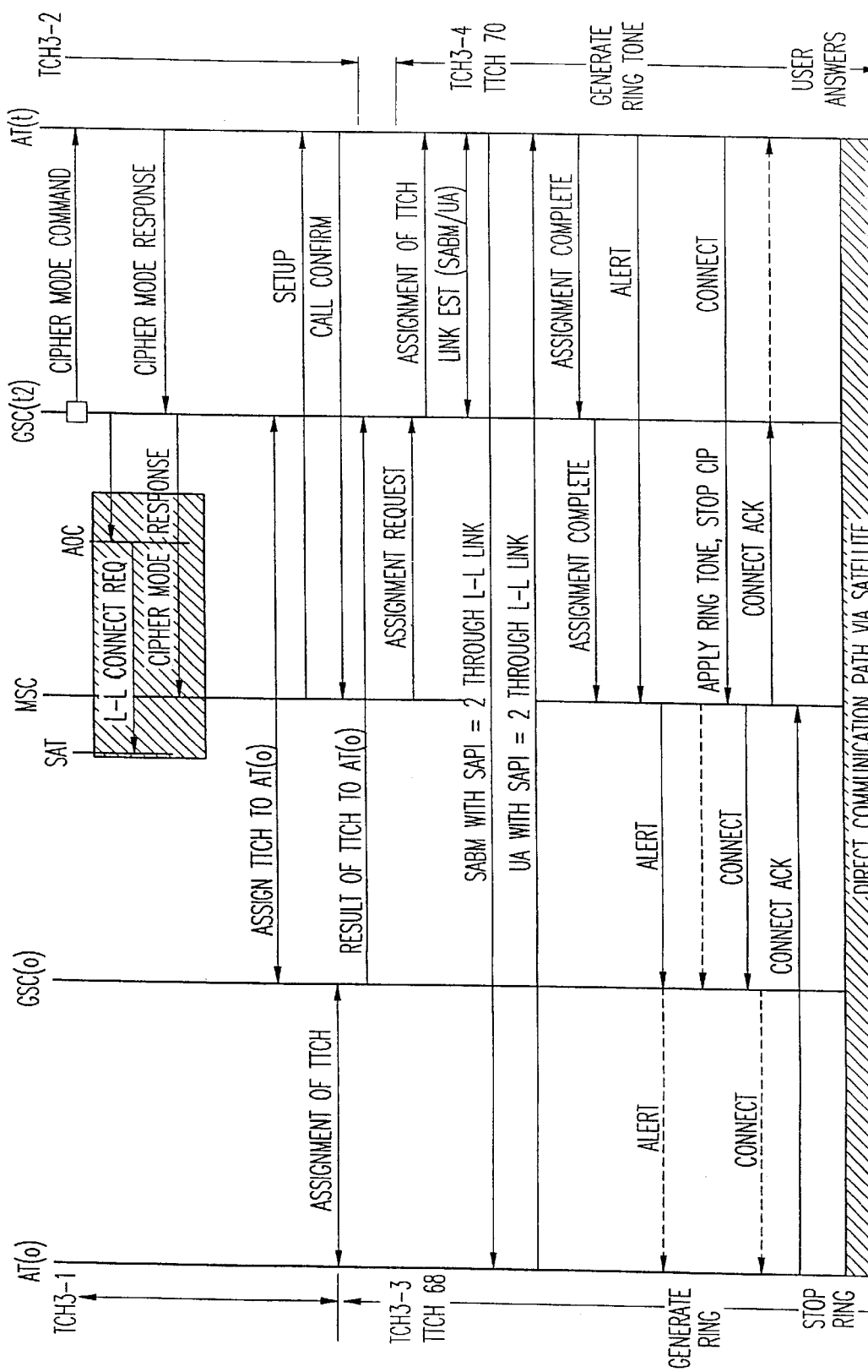

FIG. 8 illustrates the major sequence of events for a TtT call in the MSAT system 10. A MSAT subscriber AT(o) 14 visiting at the GS(o) 20 calls a GSM/MSAT subscriber AT(t) 16 visiting the MSAT network at GS(t) 22. In order to establish a single-hop TtT call between two subscribers roaming in the MSAT network via a single-hop, both ATs need to be registered at the same GS (i.e., to use the same MSC/VLR). If the AT(t) is registered at a GS other than the originating AT(o)'s GS at the time of call origination, then the AT(o) is reregistered to the GS of the destination AT(t). Once both ATs are registered at the same GS, call control signaling procedures for both ATs take place at the same GS.

During the signaling procedure, the MSC 34 indicates to the GSC(t2) 44 that the call is a TtT call. The GSC(t2)/TCS (t) requests the AOC 38 to connect the requested L-L traffic channel at the satellite 12, while signaling for the call takes place on the currently assigned channel. The AOC 38 connects the L-L channel and returns the allocated resources to the TCS(t), which in turn transfers the resources containing TtT parameters to the GSC(t1) 46 and the GSC(t2) 44, respectively. On receipt of the TtT container, the GSC(t2) performs the assignment of traffic channels, which are cross-connected (L-L) at the satellite 12. On successful completion of the assignment, the GSC(t1) informs the TCS(t). The TCS(t) in turn transfers the TtT parameters to the GSC(t2). The GSC(t2), on receipt of the ASSIGNMENT from the MSC, assigns the L-L channel connected at the satellite 12 to the AT(t). On establishment of a single-hop call, the ATs communicate with each other via single-hop. At the same time, the GS 18 listens to the conversations of both ATs for the purpose of interception. The signaling protocol between the network and the AT operates in the same way as in a GSM system. At the physical layer, the communication in the AT-to-network direction takes place on a feeder link point-to-point channel. In the network-to-AT direction, the signaling information is transferred on a point-to-multipoint channel, as shown in FIG. 7.

3.1.1 Call Establishment Procedure—Originating Side
3.1.1.1 GS Selection/Radio Resource Allocation The MSAT network performs the following functions during this procedure: (1) numbering analysis of the called pany; (2) validation of the GPS position of the calling party AT(o) and roaming agreement; (3) selection of the optimal GS(t); (4) assignment of TCHs (i.e., one for signaling and one for connecting at satellite 12); (5) transfer of the information related to the TTCH channel, GPS value, and temporary terminal identification (TT_id) used by the terminal to receive TTCH messages; and (6) provide timing, power, and frequency correction. In the TtT call Immediate Assignment procedure, the AT(o) 14 sends a CHANNEL REQUEST on the RACH with the called party number and GPS position and waits for the IMMEDIATE ASSIGNMENT on the AGCH of the corresponding common control channel . On the network side, on receipt of the CHANNEL REQUEST message, the TCS(o) 26 determines whether or not the called party number is MSAT/GSM or in a PSTN network by analyzing the received called party number. In case the called party number is either GSM (dual-mode) or the MSAT network, the TCS(o) 26 sends an IMMEDIATE ASSIGNMENT with a PAUSE indication to the AT(o) 14. The TCS(o) interrogates the called party HLR 36 (e.g., a GSM or a MSAT network HLR) to determine the current location of the called AT(t) (i.e., the MSC ID of the AT(t)).

The TCS preferably does not consider supplementary services when routing TtT calls. Specifically, it will not recognize that some call forwarding or call barring service at the destination will prevent completion of a TtT call to the dialed number. Nor will it analyze a call forwarding number and create a single-hop TtT call to the call forwarding destination.

The TCS(o) 28 validates the radio resource agreement (between the current GS(o) and the selected GS(t)), restrictions, if any, the ATs position, and the roaming agreement (between the AT(o) home PLMN and the PLMN of the selected gateway). If there are no restrictions, the TCS(o) identifies the call as a TtT call, allocates two traffic channels (TCH) and additional TtT parameters CTCH channel, TT_id, and additional TCH channel used in establishment of a single-hop call and transfers the TCH and TtT parameters to the TCS(t) via INCS 52 messages.

The TCS(t) 30 validates and assigns the loaned resources to the GSC(t1) 46. The GSC(t1) activates the resources and acknowledges to the TCS(t). The TCS(t), in turn, acknowledges receipt of the transferred resources to the TCS(o). The TCS(o), on receipt of acknowledgment of the transferred resources, computes timing, frequency, and power correction for the AT(o) 14 and assigns the allocated traffic channel to the AT(o) by sending the IMMEDIATE ASSIGNMENT (PAUSE=False) on the corresponding CCCH with an indication to initiate a location update. At the GS(t), the TCS(t) 30 assigns the resources and transfers the Call Reference ID(o) to the selected GSC(t1) to identify the originating side of the TtT call.

The AT(o) 14, on receipt of the IMMEDIATE ASSIGN E (PAUSE=false) message, activates the assigned channel and initiates a link establishment procedure on the assigned (TCH) channel. In this procedure, the AT(o) sends a SABM, and the GSC(t1) 46 sends an unnumbered acknowledgment (UA) in response to the SABM message. On successful completion of the link establishment, the RR connection is known to be established between the AT(o) 14 and the GS(t) 22.

3.1.1.2 Registration/Authentication of AT(o) with GS(t)

On successful establishment of the radio link, the AT(o) 14 initiates the location update procedure (GSM 4.08) and gets registered at the selected gateway GS(t) 22. In this procedure, the GSC(t1) 46 marks the established RR connection as a TtT call-type connection and starts to wait for the CM SERVICE REQUEST/LOCATION UPDATE message. The AT(o) 14 initiates a location update procedure with FOR=true. The GSC(t1) builds a signaling connection control port (SCCP) connection and transfers the Layer 3 message to the MSC. The main parameters of the SCCP connection request are the Layer 3 message (location update), the value of the GPS position in the CI field, and the TtT container initialized with a Call Reference Id(o). The MSC performs authentication, ciphering, and the TMSI allocation procedure.

On receipt of the LOCATION UPDATE REQUEST (FOR=true) message, the GSC(t1) 46 fills the TtT container with the Call Reference ID(o) and transfers it to the MSC 34 during the SCCP connection establishment procedure. The MSC preferably does not release the SCCP connection at the end of the location update. The MSC is informed of this condition via the "Follow-on Request Pending" information element in the LOCATION UPDATING REQUEST message received from the AT. If the FOR=True, MSC does not release the correction at the end of the location update procedure. The following procedure and FIG. 9 describe the location update procedure for a terminal subscriber when initiating a call to a destination that requires the terminal subscriber to be reregistered.

Authentication

The AT(o) 14 sends a LOCATION UPDATE message with (FOR=True) to the MSC 34 of the selected gateway, starts a timer, and waits for the LOCATION UPDATE ACCEPT/LOCATION UPDATE REJECT message from the network or expiration of the timer. On receipt of the LOCATION UPDATE REQUEST message, the GSC(t1) 46 establishes an SCCP connection request. In this procedure, the GSC(t1) transfers the COMPLETE LAYER 3 message to the MSC 34. The main parameters of the COMPLETE LAYER 3 message are the Layer 3 message (LOCATION UPDATE), the TtT container with Call Reference Id(o), and the global positioning system (GPS) position (i.e., the region in which AT is located).

On establishment of the SCCP connection, the MSC 34 recognizes that the SCCP connection is established for single-hop TtT calls, disables certain satellite switching and SMS services for the AT(o) 14, and initiates the authentication procedure by sending the AUTHENTICATION REQ message (RAND) to the AT(o) 14 via an AUTH_CMD signal The AUTHENTICATION REQ message is a DTAP message and passes transparently through the GSC(t1) 46. The AT(o) 14 computes the signature response value (SRES) by using the RAND, A3, and Ki of the AT(t). On completion of the computation, it responds to the network with SRES via the AUTH CATION RESPONSE MESSAGE, which is also a DTAP message and passes transparently via the GS to the MSC. The MSC validates the signature response (SRES) value; if it is correct, the MSC initiates a ciphering procedure, otherwise; the MSC rejects the location update procedure. The MSC indicates rejection to the AT(o) by issuing a LOCATION UPDATE reject message, and initiates a channel release procedure.

Ciphering

The MSC 34 then initiates the ciphering procedure by sending a CIPHER MODE COMMAND (WITH CIPHERING ALGORITHM A5/1, A5/2, OR NO CIPHERING) to the GSC(t1) 46. The GSC(t1) sets the CU 54 with A5/2 and Kc1 and builds a MSAT air interface 40 message, CIPHERMODE COMMAND, and requests the AT(o) 14 to perform ciphering by using A5/2 as the ciphering algorithm and ciphering key (Kc1). The AT(o) uses ciphering key (Kc1) and ciphering algorithm A5/2 and sends the CIPHERMODE COMPLETE message ciphered with Kc1 to the network. The GSC(t1) deciphers the received message and transfers it to the MSC 34.

TMSI Allocation

Figure 9:
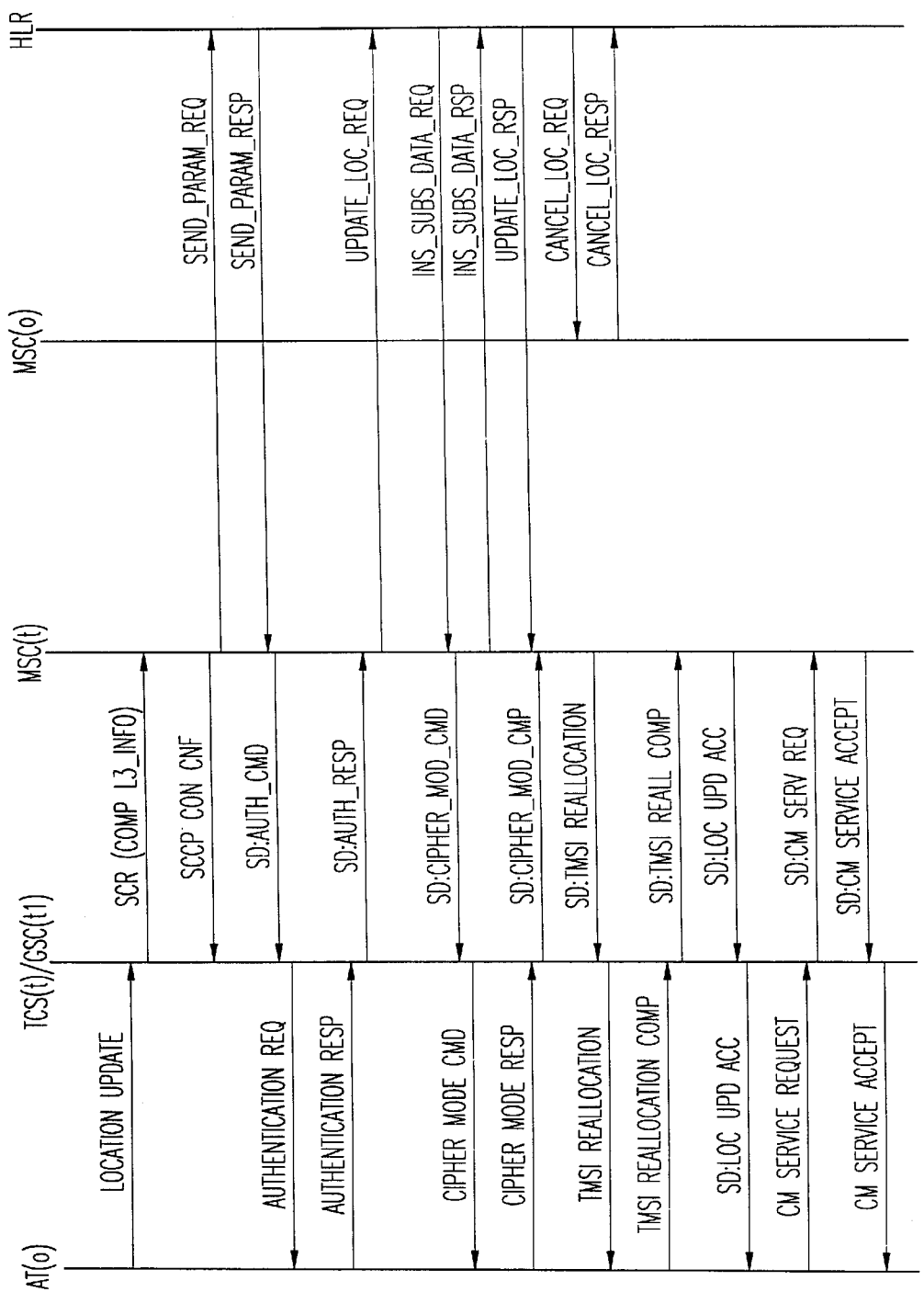
FIG. 9 illustrates signals transmitted between MSAT system components to establish a mobility management connection in accordance with an embodiment of the present invention.

With continued reference to FIG. 9, on completion of the ciphering, the MSC transfers the temporary mobile station identity MSP) and location area identifier (LAI) in a TMSI reallocation procedure. The AT(o) 14, on receipt of the TMSI and LAI (the location area code IE of the LAI carries the new value of the MSC(t) assigned by the GS(t1) and the spot beam ID remains unchanged) updates its subscriber identity module (SIM) card with the new values of the TMSI and LAI. The MSC sends the Location Update Accept message with FOP=True. The MSC defers the link release procedures after completion of the location update procedure.

The AT(o) 14 issues the CM SERV REQ message. The GSC(t1) transfers the message to the MSC on the same SCCP connection used for the location update. The MSC, on receipt of the CM SERVICE REQUEST, sends the CM SERVICE ACCEPT message to the AT(o) 14. On the AT(o) side, an MM connection is established upon receipt of the CM SERVICE ACCEPT message. Finally, the processing continues into the call set-up procedures with the SETUP message.

3.1.1.3 Call Control Procedure

In this procedure, the GS(t1) transfers the AT(o)-originated DTAP (SETUP) messages to the MSC 34 over the established SCCP connection without any modification. The MSC indicates the progress of the call by issuing a CALL PROCEEDING message to the originating AT(o), as indicated in FIG. 8. Upon transferring the CALL PROCEEDING message, the MSC 34 initiates an assignment of traffic channels to the AT(o) 14. Upon receipt of the ASSIGNMENT message, the GSC(t1) 46 examines the assignment request to initiate a channel mode modify procedure or assignment procedure.

On the assigned TCR the GSC(t1) 46 initiates a channel mode modify procedure to AT(o) 14. The GS(t1) initiates this procedure by issuing the CHANNEL MODE MODIFY message to the AT(o) 14. The originating AT(o), on receipt of the CHANNEL MODE MODIFY message, changes the mode of the existing channel and acknowledges to the GS(o) 20 by transferring a CHANNEL MODE COMPLETE message to the GS(o). Upon receipt of the CHANNEL MODE COMPLETE message, GS(o) sends the ASSIGNMENT COMPLETE to the MSC. If the AT(o) is at the SDDCH channel at the time ASSIGNMENT is received by the MSC (i.e., as opposed to very early assignment of TCH for signaling), the GS(o) initiates an assignment procedure and assigns a TCH to the AT(o).

3.1.2 Call Establishment Procedure-Terminating Side

Upon receipt of a SETUP message from the AT(o) 14, the MSC 34 analyzes the country code/national destination code (CC/NDC) part of the called party number, and interrogates the HLR 36 to determine the mobile subscriber routing number (MSRN) and the international mobile subscriber identity (IMSI) to determine the location of the called subscriber AT(t) currently roaming in the MSAT network, and issues a PAGING message to the AT(t) with a TtT indicator. The AT(t), on receipt of the PAGING REQUEST message, initiates a radio link establishment procedure with GS(t) 22. The GS(t) 22 validates the position provided by the AT(t). If the GPS position of the AT(t) is valid, it allows AT(t) to establish a connection with GS. On successful establishment of a radio link, the AT(t) sends the PAGE RESPONSE message to the GS. The GSC performs the establishment of the SCCP connection with the MSC and transfers the GPS position in a configuration item (CI) field for billing and call interception purposes. On successful completion of the SCCP connection, the MSC initiates authentication, ciphering and call control procedures. The MSC verifies that the TtT container during the SCCP connection request disables certain SS and SMS services, saves the TtT container, and transfers to the terminating side during ciphering phase via CIPHER MODE COMMAND message if the bearer capability of the setup message indicates a voice call only. After completion of the assignment procedure on the originating side, i.e., on receipt of the ASSIGNMENT COMPLETE message from the GS(t1), the MSC issues a PROGRESS message (with an indication for the generation of CIP tones) and also applies Call in Progress (CIP) tones to the AT(o) 14 on the assigned traffic channel (TCH). Upon receipt of the PROGRESS message (with an indication to generate CIP tones), the AT(o) 14 starts to generate the CIP tones and provides them to the user.

3.1.2.1 Radio Resource Allocation

On receipt of a PAGE request from the MSC(t), the GSC(t2)/TCS(t) determine the CCCH ID and page group ID and issue a the PAGE message over the air on the selected COCH. The terminating AT, listening to the PAGE in the COCH paging channel (PCH), responds to the PAGE by initiating the Channel Request procedure on the RACH. The AT sends a CHANNEL REQUEST message in the RACH and waits for the IMMEDIATE ASSIGNMENT message on the AGCH of the corresponding COCH. On assignment of TCH by the network to the AT(t), the AT(t) activates the assigned channel and establishes a link with the network by using the SABM/UA procedure. The GSC(t2) 44 also keeps a spare TCH 60 and reserved TTCH channel 66, and uses them at the time of single-hop connection. On successful completion of the link, the AT(t) sends a first Layer 3 message PAGE RESPONSE with the terminal identity (IMSI/TMSI) and class mark of the AT(t). HLR interrogation need not be performed. The GSC(t2) 44 transfers the class mark information to the TCS(t). The TCS(t) indicates to the GSC(t2) the type of the ciphering algorithm that will be used for the establishment of the single-hop call. The GSC(t2) also establishes an SCCP connection with the MSC and sends a PAGE RESPONSE message to the MSC during establishment of the connection.

3.1.2.2 Authentication and L-L Connection

Authentication

FIG. 8 shows the Authentication/Ciphering procedure between the terminating AT(t) and the MSC, which is initiated by the MSC and is as described in connection with the originating side.

Ciphering

In this procedure, the MSC requests the AT(t) 16 to carry out a ciphering procedure by using A5/1, A5/2 or no ciphering and Kc2 by issuing a Ciphering Command message. The GSC(t2) 44 checks for the indication of the TtT container. On receipt of the TtT container, the GSC(t2) transfers the Call Reference Id(o) to the TCS(t) 30. On receipt of the Call Reference Id(o), the TCS initiates the procedure for establishment of a single-hop TtT call. In this procedure the TCS(t) assigns a Call Reference Id(t) to identify the terminating session of the TtT call, transfers it to the GSC(t2), generate the common ciphering key (Ktt) to be employed in the call by using the MSAT Random Number Generator, and requests the AOC 38 to perform an L-L connection at the satellite 12. In this procedure the TCS(t) provides two separate (L-C) carriers to the AOC 38 with a request to connect at the satellite 12, and at the same time it allows both the ATs and the network to continue the signaling procedure on the existing channel without any interruption.

L-L Connection

On receipt of Cipher Mode Command with TtT container from the MSC by the GSC(t2) 44, then GSC(t2) requests the TCS(t) 30 to initiate an L-L connection procedure. In this procedure, it sends a request to the AOC 38 to wait for the AOC's response. The AOC 38 examines the request. If the AOC 38 is able to perform a connection of the requested L-L channel at the satellite 12, it issues a command to the satellite 12 payload procedure and notifies the TCS that the L-L connection can be established at the satellite 12. On receipt of the AOC 38 response with an indication of successful completion of the L-L channel connection at the satellite 12, the TCS(t) signals to the GSC(t1) 46 to initiate an assignment procedure (TTCH) on the originating AT(o). Upon successful completion of the assignment of the TCH and TTCH channel, the AT(o) 14 becomes aware that this is a single-hop TtT call. Upon successful completion of the TTCH assignment on the originating side, the TCS signals the GSC(t2) to initiate a TCH and TTCH channel assignment procedure on the terminating AT(t).

In the TTCH assignment procedure, the MSAT network transfers the required instrumentation such as Ktt, TCH, TTCH channels and AT mode of operation to both AT's. During a TtT call, after an L-L link 62 has been established and employed, signaling messages from the GS(o) and GS(t) 22 to AT(o) 14 and AT(t)16, respectively, are transmitted through the TTCH channels 68 and 70, while signaling from AT(o)14 and AT(t)16 to GSC(t1) and GSC(t2) goes through the corresponding L-C TCH3 channel. When two ATs are initially registered at different GSs, TTCH 68 comes from the GS at which the originating AT, AT(o)14 is initially registered, and not from the GS(t) 22. The main reason is that it is a waste of resources to assign one whole TTCH channel from GS(t) 22 to a different spot beam (i.e., the GS(o) coverage area), where AT(o) is currently located for only a small number of ATs. Thus, the information for AT(o) from GSC(t1) 48 is forwarded to GSC(o) 28 (for further transmission through TTCH) through the INCS 52.

If the AOC 38 fails to connect to the L-L channel at the satellite 12, the AOC 38 notifies the TCS. The TCS does not initiate a TTCH assignment procedure on the originating side or on the terminating side of the ATs. In this case, both ATs stty at the assigned channel and the call is double-hop. The MSC, however, treats the call as a single-hop call. If the L-L channels are connected at the satellite 12, but the assignment of this channel fails at the originating side, the TCS does not initiate a request for assignment of a new channel (connected at the satellite 12) on the terminating side, and the call is in a double-hop mode. The MSC also treats this call as a single-hop call.

During the above steps, the signaling procedure between the AT(t) 16 and the MSC 34 proceeds in a normal way on the existing channel without any interruptions. The GSC(t2) 44, on receipt of CIPHERMODE COMMAND message with TtT container, transfers the CIPHERING message to the AT(t) without the TtT container and continues to communicate with the AT(t) on an existing channel. At the end of the ciphering procedure the MSC performs the CC procedures on existing and new assigned channels.

3.1.2.3 Call Control Procedure

In this procedure, the MSC performs late traffic channel assignment. This procedure is indicated to the AT(t) 16 by the MSC 34 via a SETUP message by not including the SIGNAL IE in the message. The MSC transfers the SETUP (without the SIGNAL IE) message to the GSC(t2) 44 over the established SCCP connection, as shown in FIG. 8. The GS(t2) 44 transfers the message to the AT(t) over the air without modifications. The AT(t) sends a CALL CONFIRM message in response to the SETUP message to the GS(t2). The GS(t2) transfers the received CALL CONFIRM message to the MSC on the established SCCP connection. The MSC, upon receipt of the CALL CONFIRM message, issues the ASSIGNMENT message to the GS(t2). The GS(t2) examines the request and performs a TTCH assignment procedure at the terminating side. If the AT(t) is on the SDCCH channel and the originating side TTCH assignment fails (i.e., AT(o) communicates with the network via the TCH), then GSS(t2) will perform an assignment procedure for the assignment of TCH at the terminating side.

During TTCH assignment procedure on the terminating side, the direct communication between two ATs is verified by establishing a link on the L-L channel 62 at SAPI 2, and initiated by the AT(t) 16. In case both ATs fail to communicate with each other using Ktt, the AT(t) reports an assignment failure of the TTCH channel to the network via ASSIGNMENT FAIL. The AT(t) reverts to the old channel, and the original ciphering key and the call will remain in a double-hop mode only. The network assigns a TCH to the AT(o) and performs a channel mode modify procedure to the terminating AT(t). The AT(t) generates a ring and transfers an Alert Message to the network. The network transfers the Alert Message to the At(o). The AT(o) generates a ringback tone.

3.1.3 End-to-End Voice Path

FIG. 8 illustrates the establishment of end-to-end voice path on the L-L channel. In this procedure, upon assignment of the traffic channel to the AT(t), the AT(t) generates the ringing indication to the user and sends the ALERTING message to the MSC. The MSC forwards an ALERTING message to the originating AT(o) to indicate that the far end is ringing. Upon receipt of the ALERT message, the AT(o) 14 generates a local ringback. The ringback tone is generated locally because the AT knows that this is a TtT call, and the ringing tone cannot be received as channels are connected at satellite 12. The terminating AT's user picks up the phone (off-hook) and accepts the call by sending a CONNECT message to the MSC. On detection of an off-hook condition, the AT(t) stops ringing. Upon receipt of the CONNECT message, the GSC(t2) 44, GSC(t1) 46 releases the old resources and the MSC sends CONNECT ACK to the AT(t) and forwards the CONNECT message to the AT(o) 14. The AT(o), upon receipt of the CONNECT message, stops the ringback tone and enables a direct communication with the AT(t) via a single-hop on the assigned traffic channel

3.2 TtT Call Between ATs Registered at the Same GS

Most of the procedures are the same as described above. The main differences in this procedure, as compared to using two GSS, is as follows: (1) the TTCH channel is supported by the same GS; (2) there is no need for INCS 52 communication; (3) there is no need to verify radio resource and roaming agreement or call restrictions; and (4) the same GS 18 uses one TCH3/SDDCH for signaling and reserves one TCH-3 on each side to connect at satellite 12 at the appropriate time of the signaling as described in previous section.

In this scenario, an MSAT system subscriber AT(o) visiting at GS(o) calls a GSM/MSAT subscriber AT(t) visiting the MSAT network at the same GS(o), i.e., both of the ATs are registered at the same GS. Both mobile terminals are registered at the same MSC, so there is no need to perform a registration procedure of the originating AT(o), as described previously. The GS(o) 20 comprises GS(o1) and GS(o2). During the signaling procedure of the call, the MSC indicates to the GSC(o2) connected to the AT(t) 16 that the call is TtT. The GSC(o2)/TCS(o) requests the AOC 38 to connect the requested L-L traffic channel at the satellite 12 while signaling for the call takes place on the currently assigned channel. The AOC 38 connects the L-L channel and returns the allocated resources to the TCS(o) 26, which in turn transfers the resources containing TtT parameters to GSC(o1) connected to the AT(o) 14 and to the GSC(o2), respectively. On receipt of the TtT parameters, the GSC(o1) performs the assignment of traffic channels, which are connected at the satellite 12. On successful completion of the assignment, the GSC(o1) informs the TCS(o). The TCS, in turn, transfers the TtT parameters to the GSC(o2). The GSC(o2), on receipt of the ASSIGNMENT from the MSC, assigns the L-L channel connected at the satellite 12 to the AT(t). On establishment of a single-hop call, the ATs communicate with each other via single hop. At the same time, the GS(o) 20 listens to the conversations of both ATs for the purpose of interception. The signaling protocol between the network/AT runs in the same way as it runs in GSM: at the physical layer, the communication in the AT-to-Network direction takes place on feeder link point-to-point channels, and from the network to the AT the signaling information is transferred on a point-to-multipoint channel.

3.3 Incomplete Call Conditions

3.3.1 No Response from AT(t)

If the terminating side does not respond to a PAGE and the HPA, the MSC plays an announcement to the AT(o) 14 and forwards the call to a forwarding number. If the forwarding number is not available, the MSC releases the call and plays an announcement at AT(o).

3.3.2 Terminating Side Busy

If the terminating side is engaged in a call (e.g., a voice call, a SS or SMS), the MSC sends a SETUP message to the AT(t) 16, and the rest of the processing is based on the response of the AT(t). On receipt of the SETUP message, the AT(t) generates the WAIT tone. If the user accepts the call, the call is established between two ATs, i.e., AT(o) 14 and the AT(t) 16, via double-hop. If the user declines the call, the MSC plays an announcement (optional) to the AT(o) and forwards the call to the forwarding number. If there is no call forwarding number, the call is released, and an announcement is played (optional) to the AT(o) by the MSC.

3.3.3 Terminating Side Does Not Answer

On receipt of the ALERT, the MSC starts a timer (Connect Wait Timer). If the terminating party does not answer the call, the Connect Wait Timer expires, and the MSC performs a number of operations beginning with the disconnection of the terminating side connection. At the same time, the MSC requests the GSC(t1) to assign the normal traffic channel to the AT(o) 14 while initiating a channel assignment ACED procedure. The GSC(t1) 46 receives an ASSIGNMENT message from the MSC and performs the assigning of the TCH channel to the AT(o). Upon the successful completion of the TCH assignment, the GSC(t1) sends the ASSIGNMENT COMPLETE message to the MSC. The existing TTCH channels are released, and AT(o) 14 communicates with MSC via the TCH channel only with same old ciphering key. Upon receipt of the ASSIGNMENT COMPLETE message, the MSC plays the announcement to the AT(o) and initiates the SS services.

In the abnormal cases of TtT calls as described in Sub-sections 3.3.1, 3.3.2, and 3.3.3, the network performs the following actions. If a TtT call is attempted and the optimal MSC commences forwarding or treatment instead of connecting the call to the dialed number, the call becomes a TtG call. If the call is forwarded to a AT, a double-hop call results.

3.3.4 TTCH Assignment Failure

If for any reason the TTCH assignment procedure fails, then the affected GSC uses the existing TCH resources, and the call will remain in double-hop mode.

3.3.4.1 TTCH Assignment Failure on Terminating Side

If any one of the operations described above in connection with the termination side performing authentication, ciphering and L-L connection fails, the GSC(t2) 44 initiates the subsequent channel assignment procedure on the originating side and channel mode modify procedure on the terminating side, and the call remains in a double-hop mode. The TCS 30 informs the AOC 38 to deallocate the TtT channels connected at the satellite 12.

In the channel mode modify procedure, the GSC(t2) 44 issues a CHANNEL MODE MODIFY message to the terminating the AT(t) 16. The terminating AT(t) changes the mode of the channel, and on completion, the AT(t) 16 sends acknowledgment of the channel mode modify to the GSC (t2) by transferring the CHANNEL MODE MODIFY ACK message. On receipt of the CHANNEL MODE MODIFY ACK message, the GSC(t2) sends the ASSIGNMENT COMPLETE message to the MSC 34 in response to the ASSIGNMENT message issued by the MSC.

3.3.4.2 AT(o)-AT(t) Communication Link Fails

During assignment of TTCH, TCH channel, the terminating AT(t) communicates with the originating AT(o) 14. In case the terminating AT(t) fails to establish a logical link with SAPI 2 on L-L channels, the terminating AT(t) reports to the network via ASSIGNMENT FAIL via the old TCH with the old (Kc2) and stays on it. In this case, the TCS(t) requests the originating AT(o) to switch back to the old TCH channel with old (Kc1), and the call remains in a double-hop mode.

3.3.4.3 TTCH Assignment Failure on Originating Side

If the assignment of the TTCH fails on the originating side, the originating GSC(t1) 46 informs the TCS of the result of the TTCH assignment. The TCS(t) 30 informs the GSC(t2) 44 about the status of the assignment. In case it indicates failure, the terminating GSC(t2) will not perform the TTCH assignment on receipt of ASSIGNMENT message from the MSC(t) 34, and the call will go as double hop.

3.3.5 Other Failure Conditions

In the case that no TtT resources are available, this event triggers the establishment of a double-hop call. The call is handled in a similar manner to an Assignment Failure of the TtT segment.

If the AOC 38 fails to connect L-L Channel, the call is treated as a double-hop call. The TCS(t) 30 deallocates the TtT single-hop radio resources. The AT(o) 14 and the AT(t) 16 remain connected with the GS(t) 22 via the original TCH channel only. If the MSC 34 fails to indicate the AT-AT indication, the MSC verifies the bearer capability (B) IE in the SETUP message. If the BC parameters do not indicate a voice call, the MSC does not provide a TtT indication, as well as TtT container to the terminating GSC, and the call is treated as a double-hop call. If the satellite 12 fails to connect the L-L Channels, this error is determined by the terminating AT(t). At the time of TTCH, TCH assignment to the AT(t), the AT(t) attempts to communicate with the AT(o) 14 and establishes a link with the AT(o) on SAPI 2. If both mobiles cannot communicate, then it is concluded that the satellite 12 failed to connect L-L channels, and calls go through a double-hop mode.

If the AOC fails and both ATs are already at the same GS, the call remains in double-hop mode, and supplementary and SMS services still remain disabled. The MSAT system 10 preferably establishes the double-hop call in the following cases: (1) AT(o) position is not valid, and roaming and radio resource agreements do not exist between the required GS; (2) the call is different from voice (data, facsimile, and alternate voice/facsimile); (3) the ATs do not have a common ciphering algorithm; or (4) the ATs fail to establish a direct communication (SAPI 2) on the L-L connected channels.

3.4 Call Release Procedures

In the MSAT system 10, the TtT call release procedure can be initiated by the operator, as well as by the user (originator/terminator). The call release procedure involves three phases: (1) the CC release procedure, (2) the channel release procedure, and (3) the L-L disconnect procedure at the satellite 12. The resource becomes available once the resource is disconnected at the satellite 12. In the MSAT system 10, the operator can initiate the call release procedure once the operator determines to release the call. In this case, the disconnect message to both ATs is initiated by the MSC. The message flow is substantially the same as in the case where call release is initiated by the originating mobile, except some changes in the direction and in the sequence of the signaling message flow. For a AT-AT call release in two-satellite mode, if network requests the AT to perform a satellite switching operation (e.g., going back to the old satellite), the AT performs this operation; otherwise, it stays on the new switched satellite 12.

Although the present invention has been described with reference to a preferred embodiment thereof, it will be understood that the invention is not limited to the details thereof. Various modifications and substitutions have been suggested in the foregoing description, and others will occur to those of ordinary skill in the art. All such substitutions are intended to be embraced within the scope of the invention as defined in the appended claims.

What is claimed is:

1. A first gateway station in a mobile satellite system for establishing a single-hop, terminal-to-terminal call between an originating terminal and a destination terminal using assigned channels at a satellite, the first gateway station comprising:

a transceiver and controller device for establishing a radio communication link with said originating terminal; and traffic control system connected to said transceiver and controller device for performing at least one of a plurality of operations comprising: managing the allocation of said satellite channels to said first gateway station; assigning said originating terminal with at least one of said channels and a reserved one of said channels for a call path in response to data provided by said originating terminal indicating that said terminal-to-terminal call to another terminal in said system is desired, validating said originating terminal position, determining the mobile switching center identity corresponding to said destination terminal, and reserving one of said channels for signaling to said originating terminal during said terminal-to-terminal call.

2. A first gateway station as claims in claim 1, further comprising:

a second transceiver and controller device for establishing a radio communication link with said destination terminal, said traffic control system being connected to said second transceiver and controller device for performing at least one of a plurality of operations comprising assigning said destination terminal with at least one of said channels and a reserved one of said channels for said call path, and reserving one of said channels for signaling to said destination terminal during said terminal-to-terminal call.

3. A first gateway station as claimed in claim 2, wherein said system has a mobile switching center, said transceiver and controller device and said second transceiver and controller device each being operable to establish a mobility management connection with said mobile switching center.

4. A first gateway station as claimed in claim 2, wherein one of said transceiver and controller device and said second transceiver and controller device is operable to request cross-connection of said reserved ones of said channels for said call path for said originating terminal and said destination terminal.

5. A first gateway station as claimed in claim 4, wherein one of said originating terminal and said destination terminal transmits a service access point identifier signal having a value indicating that said signal is a terminal-to-terminal signal to be ignored be said first gateway station and processed only by said originating terminal and said destination terminal.

6. A first gateway station as claimed in claim 4, wherein said transceiver and controller device and said second transceiver and controller device each use said reserved ones of said channels for said terminal-to-terminal call if said cross-connection is established, and use previously assigned said at least one of said channels to establish a double-hop call if said cross-connection was not successful.

7. A first gateway station as claimed in claim 1, wherein said originating terminal has established a radio communication link with a second gateway station having a second traffic control system for managing the allocation of said satellite channels to said second gateway station, said second gateway station being operable to register with said gateway station, said second traffic control system being operable to transfer data relating to said channels for said call path and for said signaling to said traffic control system.

8. A data signal embodied in a carrier wave comprising a segment having a first value if said data signal is to be processed by a gateway station in a mobile satellite communication system, said segment having a second value to indicate that two terminals participating in a single-hop, terminal-to-terminal call are to process said data signal and that said gateway station is to ignore said data signal.

9. A data signal embodied in a carrier wave having at least one of a plurality of segments comprising a segment for indicating that said terminal-to-terminal call is desired, a segment identifying at least one satellite channel for establishing a signaling channel between a gateway station and one of two terminals during a single-hop, terminal-to-terminal call, and a segment identifying at least one satellite channel for a call path between said two terminals during said terminal-to-terminal call.

10. A mobile satellite communication system for allowing single-hop calls between terminals in the system, each of the terminals from which a call originates being an originating terminal and the selected one of the terminals for which the call is intended being a destination terminal, the satellite having satellite resources comprising channels for call traffic comprising single-hop calls and for control signaling, the satellite resources being managed by an operations center, a mobile switching center and a home location register maintain data relating to the location of the terminals, the system comprising:
   a gateway station comprising a plurality of satellite transceivers for communicating with said originating terminal and said destination terminal, respectively, a gateway controller connected to each of said satellite transceivers and operable to control satellite communication with said originating terminal and said destination terminal, and a traffic control subsystem, said gateway controller and said traffic control subsystem each being operable communicate with said mobile switching center, said traffic control subsystem being operable to communicate with said operations center to request establishment of a single-hop satellite link between said originating terminal and said destination terminal by cross-connecting selected ones of said channels for a terminal-to-terminal call; and
   a Global System for Mobile communications (GSM)-compatible interface between said mobile switching center and said gateway controller;
   wherein said traffic control subsystem is operable to assign at least one of said channels to establish a signaling channel on which said gateway controller transmits control signals to at least one of said originating terminal and said destination terminal during said terminal-to-terminal call.

11. A system as claimed in claim 10, wherein said signaling channel is a multiplexed, point-to-multipoint channel from said gateway station to a plurally of said terminals.

12. A system as claimed in claim 10, wherein said traffic control subsystem is operable to assign a first pair of said channels for signaling by said originating terminal and said destination terminal, respectively, with respect to said gateway station and prior to establishing said single hop satellite link and to reserve another pair of said channels to be the cross-connected said selected ones of said channels during said terminal-to-terminal call.

13. A system as claimed in claim 12, wherein said mobile switching center is operable to use said signaling channel to send a message indicating that establishment of said single-hop satellite link was unsuccessful to said at least one of said originating terminal and said destination terminal said mobile switching center being operable to maintain a double-hop call between originating terminal and said destination terminal using said first pair of said channels.

14. A system as claimed in claim 10, wherein said system operates in conjunction with cooperating networks that provide at least one of mobile satellite communications and terrestrial mobile communications to user devices, said home location register being operable to maintain data relating to the location of said user devices in said cooperating networks.

15. A system as claimed in claim 10, further comprising a second gateway station with which said originating terminal is registered, said second gateway station comprising at least one transceiver for communicating with said originating terminal, a second gateway controller connected to said at least one transceiver and operable to control satellite communication with said originating terminal, a second traffic control subsystem, and a second mobile switching center, said second gateway controller and said second traffic control subsystem each being operable communicate with said second mobile switching center, said second traffic control subsystem being operable to allocate selected said channels to establish a radio communication link via said satellite between said originating terminal and said second gateway station, said second mobile switching center being operable to determine the identity of said mobile switching center and to provide data relating to said mobile switching center to said originating terminal to reregister said originating terminal to said mobile switching center.

16. A system as claimed in claim 15, wherein said second mobile switching center provides said originating terminal with data comprising at least one of a location area identifier corresponding to said mobile switching center and different from said second mobile switching center, and a temporary mobile station identity to establish a mobility management connection between said originating terminal and said mobile switching center.

17. A system as claimed in claim 15, further comprising an intranetwork communication system for allowing said traffic control subsystem and said second traffic control subsystem to communicate with each other, said second traffic control subsystem being operable to transmit to said traffic control subsystem via said intranetwork communication system data identified a selected one of said channels allocated to establish a second signaling channel between said second gateway station and said originating terminal during said terminal-to-terminal call.

18. A system as claimed in claim 17, wherein said gateway station assigns said second signaling channel to said originating terminal after reregistration.

19. A system as claimed in claim 18, wherein said gateway controller is operable to send a message signal to said second gateway controller during said terminal-to-terminal call via said intranetwork communication system and said second signaling channel.

20. A method for establishing a single-hop terminal-to-terminal call via switched satellite channels between an originating terminals and a destination terminal in a mobile satellite system comprising the steps of:

establishing radio frequency links between said destination terminal and said originating terminal and a gateway station, respectively, using respective gateway station transceivers, said gateway station having a gateway station controller connected to said gateway station transceivers and to a mobile switching center for controlling the allocation and use of said satellite channels at said gateway station;

allocating selected said satellite channels for cross-connection for a single-hop call path between said originating terminal and said destination terminal, said mobile switching center being blocked from signaling said originating terminal and said destination terminal via said single-hop call path;

allocating selected said satellite channels for signaling between said gateway station and said originating terminal and between said gateway station and said destination terminal, during said single-hop call; and sending signals via said links to said originating terminal and said destination terminal, respectively, assigning said selected satellite channels for cross-connection and said signaling.

21. A method as claimed in claim 20, further comprising the steps of:

establishing said single-hop call path using said selected satellite channels for said cross-connection; and sending a verification signal between said original terminal and said destination terminal on said single-hop call path.

22. A method as claimed in claim 21, further comprising the step of establishing a double-hop call via said satellite between said destination terminal and said originating terminal using said links if said single-hop call path fails to be established.

23. A method as claimed in 20, further comprising the step of sending a signal to at least one of said original terminal and said destination terminal via said single-hop call path, said signal being a service access point identifier signal having a value indicating that said signal is a terminal-to-terminal signal to be ignored by said gateway station and processed only by said at least one of said original terminal and said destination terminal.

24. A method as claimed in claim 20, wherein said destination terminal is registered with a second gateway station and further comprising the step of reregistering said originating terminal with said second gateway station.

25. A method as claimed in claim 24, further comprising a call progress message from a second mobile switching center connected to said second gateway station to said originating terminal.

26. A method as claimed in claim 24, wherein a second mobile switching center is connected to said second gateway station, said reregistering step comprises the steps of:

providing identification data relating to said mobile switching center to said originating terminal; and updating the location of said originating station and providing data relating to the updated location to said gateway station.

27. A method as claimed in claim 24, wherein allocation of said selected satellite channels to said originating terminal and said destination terminal for said cross-connection and said signaling is accomplished at said second gateway station and said gateway station, respectively, and further comprising the step of transmitting said selected satellite channels allocated to said originating terminal for said cross-connection and for said signaling to said second gateway station.

\* \* \* \* \*